United States Patent
Alfano

(10) Patent No.: US 8,997,547 B2
(45) Date of Patent: Apr. 7, 2015

(54) GAUGE WITH VISUAL CALIBRATION CONFIRMATION AND RELATED METHOD

(75) Inventor: Bryan Alfano, Manchester, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 575 days.

(21) Appl. No.: 13/070,363

(22) Filed: Mar. 23, 2011

(65) Prior Publication Data
US 2012/0240659 A1 Sep. 27, 2012

(51) Int. Cl.
*G01L 27/00* (2006.01)
*G01L 7/04* (2006.01)

(52) U.S. Cl.
CPC ............... *G01L 7/043* (2013.01); *G01L 27/005* (2013.01)

(58) Field of Classification Search
USPC .......................................................... 73/431
See application file for complete search history.

(56) References Cited

U.S. PATENT DOCUMENTS

| | | | |
|---|---|---|---|
| 4,279,161 A | 7/1981 | Huston et al. | |
| 5,144,814 A | 9/1992 | Gaudette | |
| 5,317,948 A | 6/1994 | Blaha | |
| 5,361,218 A | 11/1994 | Tripp et al. | |
| 5,461,901 A | 10/1995 | Ottestad | |
| 5,783,939 A | 7/1998 | Lippmann et al. | |
| 5,808,175 A | 9/1998 | Chang | |
| 6,014,075 A | 1/2000 | Fujimori et al. | |
| 6,062,063 A * | 5/2000 | Robson | 73/1.88 |
| 6,731,092 B2 | 5/2004 | Shimazaki | |
| 6,853,162 B2 | 2/2005 | Betts et al. | |
| 7,111,491 B2 | 9/2006 | Kosh et al. | |
| 7,145,309 B2 * | 12/2006 | Reiter et al. | 318/696 |
| 7,231,838 B2 | 6/2007 | Sasaki | |
| 7,543,501 B2 | 6/2009 | Cottles et al. | |
| 2010/0162822 A1 * | 7/2010 | Ward | 73/733 |
| 2011/0056301 A1 | 3/2011 | Winkler et al. | |
| 2011/0265899 A1 | 11/2011 | Cruse et al. | |

FOREIGN PATENT DOCUMENTS

| | | |
|---|---|---|
| KR | 2007101922 A | 10/1918 |
| WO | WO 93/08454 | 4/1993 |
| WO | WO 2010/025728 A1 | 3/2010 |

* cited by examiner

*Primary Examiner* — Hezron E Williams
*Assistant Examiner* — Mark A Shabman
(74) *Attorney, Agent, or Firm* — Dennis J. Williamson; Moore & Van Allen PLLC

(57) ABSTRACT

A device for taking pressure readings on a HVAC system includes a first needle connectable in communication with the HVAC system for taking a first pressure reading thereof. The first needle is mounted within a first gauge and configured to self-calibrate. The device further includes a second needle connectable in communication with the HVAC system for taking a second pressure reading thereof that is independent of the first pressure reading. The second needle is mounted within a second gauge and configured to self-calibrate. A first stepper motor actuates the first needle and a second stepper motor actuates the second needle. A microcontroller controls the first and second stepper motors to move the needles to a plurality of respective positions and thereby visually confirm calibration.

22 Claims, 2 Drawing Sheets

GAUGE WITH VISUAL CALIBRATION CONFIRMATION AND RELATED METHOD

FIELD OF THE INVENTION

The present invention relates to devices and methods for gauges, and more particularly, to devices and methods for self-calibrating heating, ventilating and/or air conditioning ("HVAC") system gauges.

BACKGROUND

In order to install or service an HVAC system, HVAC service personnel must measure the HVAC system refrigerant pressure and from the refrigerant pressure determine the saturated vapor equivalent temperature for the particular refrigerant used in the HVAC system being installed or serviced. In addition, other parameters, such as trend lines for refrigerant pressure, trend lines for saturated vapor equivalent temperature, instantaneous refrigerant pressure bar graph, or superheat/sub-cool temperature of the refrigerant, may be useful in installing or servicing an HVAC system. Conventionally, the refrigerant pressure is measured with an analog pressure gauge and the saturated vapor equivalent temperature for the refrigerant is determined from the measured refrigerant pressure either by the use of lookup tables or by the use of correlated scales on the face of the analog pressure gauge. Digital pressure gauges have also been used in this field.

A typical analog pressure gauge is mechanical and contains a bourdon tube. The bourdon tube is a mechanical transducer. The bourdon tube is a curved and partially flattened tube that tends to straighten out in proportion to internal pressure within the bourdon tube. The bourdon tube is connected to a series of watch-like gears (pointer gears) that rotate a needle shaft with an attached needle pointer to indicate the pressure on the dial of the analog pressure gauge. When the bourdon tube of the analog pressure gauge is connected to the refrigerant line, the refrigerant pressure within the bourdon tube causes the bourdon tube to straighten out so that the needle, mechanically connected to the bourdon tube through the gears, indicates the refrigerant pressure on the dial of the analog pressure gauge.

A conventional analog refrigerant pressure gauge 11 is shown in FIG. 1. When such an analog pressure gauge 11 is used to service a HVAC system, the main analog scale 13 of the analog pressure gauge 11 indicates pressure in PSI (pounds per square inch) or KPa (metric Kilo-Pascals). Additional inner analog scales (circular bands of numbers) 15 are also printed on the face of the analog pressure gauge 11. The additional inner scales 15 indicate the saturated vapor equivalent temperature for different refrigerants at the measured refrigerant pressure.

Conventional pressure gauges similar to those shown in FIG. 1 require careful calibration in order to obtain an accurate measurement. Specifically, the gauges may become inaccurate over time when they are dropped or banged during handling and moving. In some instances, HVAC technicians forget to calibrate their gauge sets. Regular calibration also can be burdensome on the technician. Additionally, even when the gauge sets are calibrated, there is a possibility that the calibration is not performed accurately. Finally, digital gauges do not include a method by which the technician is able to ascertain whether the gauges have been calibrated or, if so, in a satisfactory manner. Thus, technicians do not have confidence in such gauges and tend to steer clear of digital gauges because they lack confidence in their calibration. Inaccurate gauges lead to unsatisfactory performance of HVAC units and longer times for performing routine repair and maintenance.

It is an object of the present invention to overcome one or more of the above-described drawbacks and/or disadvantages of the prior art.

SUMMARY OF THE INVENTION

In accordance with a first aspect, the present invention is directed to a device comprising a first gauge including a first needle mounted thereon and connectable in communication with a HVAC system for displaying a first pressure reading thereof. A first motor is drivingly coupled to the first needle for moving the first needle. At least one microcontroller is electrically coupled to the first motor, and is configured to visually confirm calibration of the first gauge by moving the first needle from a first position to one or more second positions (i) during calibration, and/or (ii) following calibration, of the first gauge.

In some embodiments of the present invention, the microcontroller is configured to automatically calibrate the first gauge. Preferably, the microcontroller automatically calibrates the first gauge at startup or when the first gauge is powered on.

In some embodiments of the present invention, the at least one second position of the first needle includes: (i) a backward swept position, (ii) a forward swept position, and/or (iii) a zeroed position. In some such embodiments, the at least one second position of the first needle includes all three position, and the microcontroller is configured to control the first motor to move the first needle to the respective positions in the order indicated. In some embodiments, the backward swept position is between the zero position and the maximum pressure position, and the forward swept position is the maximum pressure position.

Some embodiments of the present invention further comprise a second gauge including a second needle mounted thereon and connectable in communication with the HVAC system for displaying a second pressure reading thereof. A second motor is drivingly coupled to the second needle for moving the second needle. The microcontroller is electrically coupled to the second motor and is configured to visually confirm calibration of the second gauge by moving the second needle from a first position to at least one second position (i) during calibration, and/or (ii) following calibration, of the second gauge.

In accordance with another aspect, the present invention is directed to a device comprising first means connectable in communication with a HVAC system for displaying a first pressure reading thereof. Second means is drivingly coupled to the first means for moving the first means to positions corresponding to respective first pressure readings of the HVAC system. Third means is electrically coupled to the second means for visually confirming calibration of the first means by moving the first means from a first position to at least one second position (i) during calibration, and/or (ii) following calibration, of the first means. In some embodiments of the present invention, the first means is a first needle of a first gauge, the second means is a first stepper motor, and the third means is a microcontroller.

Some embodiments of the present invention further comprise fourth means connectable in communication with a HVAC system for displaying a second pressure reading thereof. Fifth means is drivingly coupled to the fourth means for moving the fourth means to positions corresponding to respective second pressure readings of the HVAC system. The third means is electrically coupled to the fifth means for visually confirming calibration of the fourth means by moving the fourth means from a first position to at least one second position (i) during calibration, and/or (ii) following calibration, of the fourth means. In some embodiments of the present invention, the fourth means is a second needle of a second gauge, the fifth means is a second stepper motor, and the third means is a microcontroller.

In accordance with another aspect, the present invention is directed to a method comprising the following steps:

connecting a first gauge including a first needle mounted thereon to a HVAC system;

calibrating the first gauge; and during and/or following calibration of the first gauge, visually confirming calibration by moving a first needle of the first gauge from a first position to at least one second position.

In some embodiments of the present invention, the moving step is performed by a first electric motor drivingly connected to the first needle of the first gauge, and a microcontroller electrically coupled to the first electric motor. In some such embodiments, the at least one second position of the first needle includes: (i) a backward swept position, (ii) a forward swept position, and/or (iii) a zeroed position. In some such embodiments, the at least one second position of the first needle includes all of positions (i)-(iii) performed in the order indicated.

In some embodiments of the present invention, the method further comprises the following steps:

connecting a second gauge including a second needle mounted thereon to the HVAC system;

calibrating the second gauge;

during and/or following calibration of the second gauge, visually confirming calibration by moving a second needle of the second gauge from a first position to at least one second position.

One advantage of the present invention is that the device and method visually confirm to a user that a HVAC gauge has been calibrated. As a result, upon viewing the visual confirmation of calibration, a technician can use the respective gauge with confidence. Another advantage of a currently preferred embodiment of the present invention is that the visual confirmation of calibration moves the needle of the gauge to a plurality of respective positions on a dial of the gauge, thereby visually confirming that the gauge can properly move to such positions, and further instilling confidence in a user that the gauge is calibrated and exhibits proper and/or correct needle movement.

Other objects and advantages of the present invention, and/or of the currently preferred embodiments thereof, will become more readily apparent in view of the following detailed description of currently preferred embodiments and accompanying drawings.

DETAILED DESCRIPTION OF CURRENTLY PREFERRED EMBODIMENTS

Figure 1:
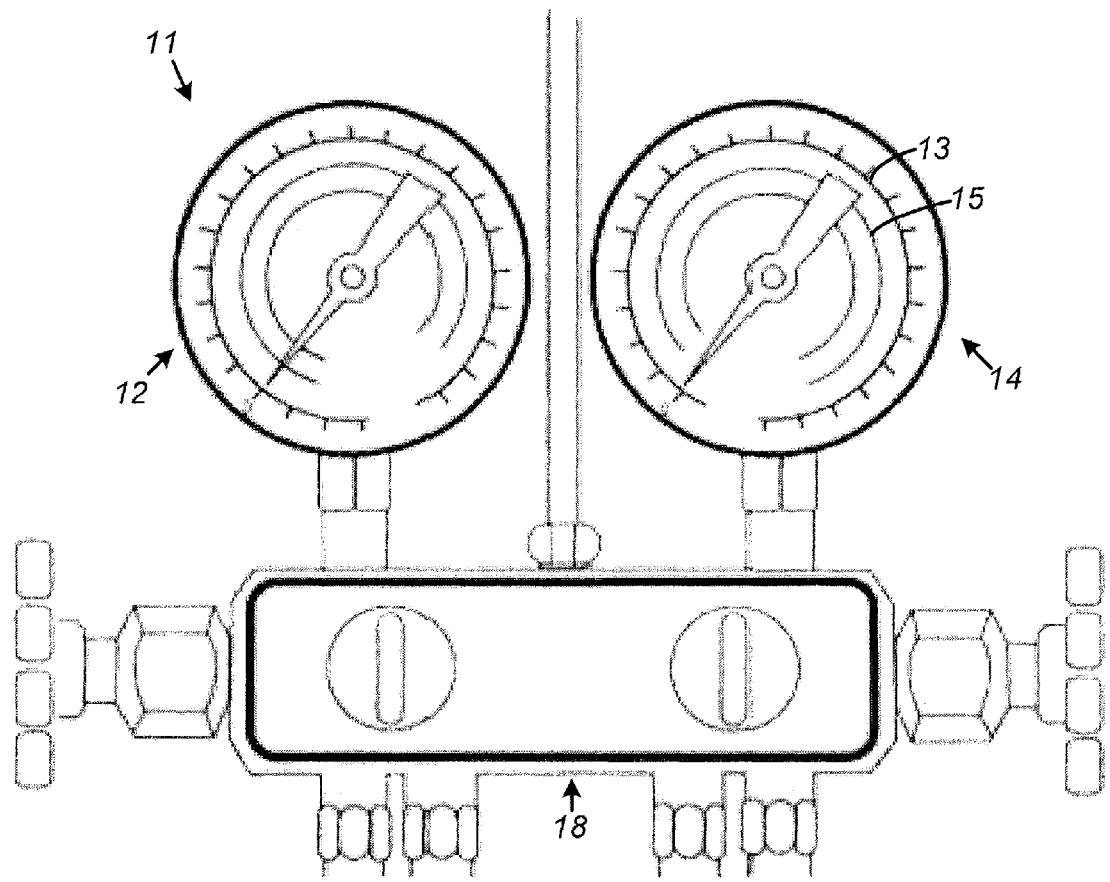
FIG. 1 is a front elevational view of a conventional analog HVAC manifold gauge set for taking two pressure readings on a HVAC system, such as a refrigeration system, and displaying the two pressure readings.

Referring to the drawings and, in particular, FIG. 1, the gauge set 11 controls the flows of pressure or gases. The gauge set 11 includes a first low pressure gauge 12 and a second high pressure gauge 14. Traditionally, the low pressure gauge 12 is identified by a blue color while the high pressure gauge 14 is identified by a red color. The gauge set typically includes three chambers: the low pressure chamber 12 (blue, left side), a utility chamber 18, and the high pressure chamber 14 (right side). When a technician connects the HVAC gauge to a HVAC unit, he or she connects the low pressure side of the HVAC unit to the low pressure gauge side 12, and the high pressure gauge hose to the high pressure gauge 14. The utility port (the middle chamber 18) is used to connect the hose to a vacuum pump or to add or remove refrigerant from the HVAC unit. The HVAC gauge set 11 allows the HVAC technician to check the unit's operating pressures, transfer refrigerant, pressure test the system, purge the system with nitrogen, and perform other necessary or regular maintenance tasks. The low pressure gauge 12 is typically mounted on the left side of the air conditioning gauges. The low pressure gauge allows the HVAC technician to measure both the pressure above atmospheric pressure and vacuum pressure (below atmospheric pressure). The high pressure gauge 14 is typically mounted on the right side of the manifold set and measures pressure above the atmospheric pressure.

Figure 2A:
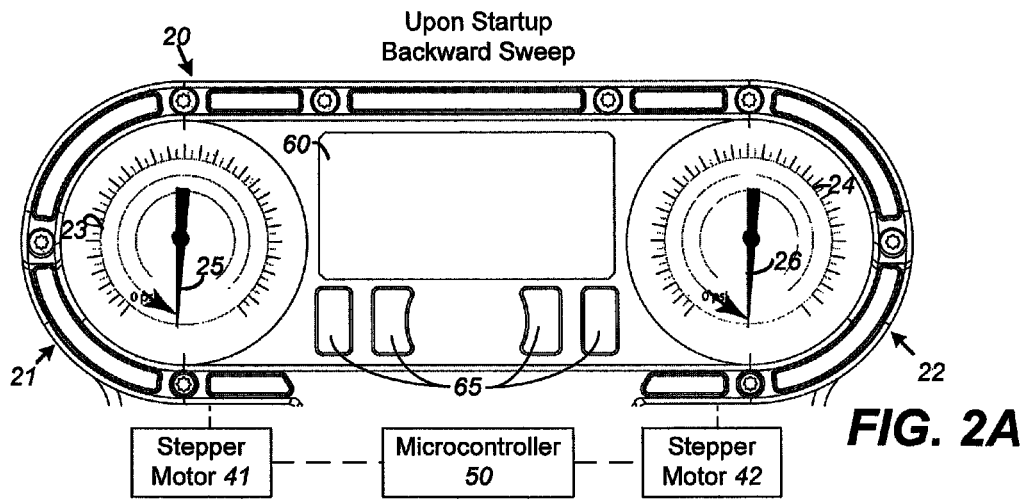
FIG. 2A is a schematic front view of one embodiment of a gauge set of the present invention showing a first backward sweep of the needles upon start up of the device to visually confirm calibration.
Figure 2B:
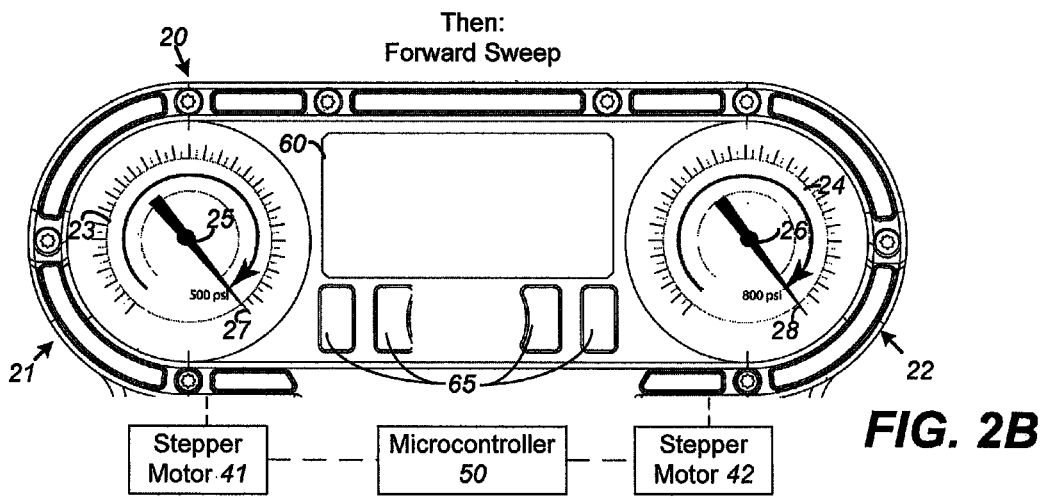
FIG. 2B is a schematic front view of the gauge set of FIG. 2A at a second step of visual confirmation of calibration showing a forward sweep of the needles.
Figure 2C:
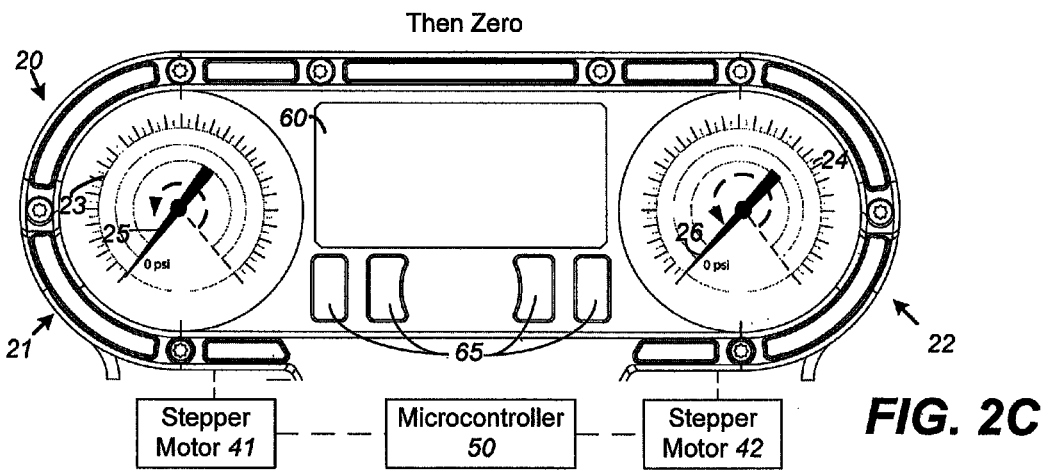
FIG. 2C is a schematic front view of the gauge set of FIG. 2A at a third step of visual confirmation of calibration showing the needles zeroed out or at the zero position.

FIGS. 2A-2C show a gauge set 20 having a low pressure gauge 21 and a high pressure gauge 22. The two gauges 21, 22 further include markings 23, 24 used to indicate the pressure (in, for example, psi) in each of the gauges. The low pressure gauge 21 includes a low pressure needle 25 and the high pressure gauge 22 similarly includes a high pressure needle 26. When the device is off, the low pressure needle 25 and the high pressure needle 26 are both set to 0 psi.

The low pressure needle 25 and the high pressure needle 26 are coupled to stepper motors 41 and 42, respectively, which are synchronous electric motors that can divide a full rotation into a large number of steps. The stepper motors 41, 42 are coupled to a microcontroller 50 which relays information to the stepper motors 41, 42 about the position of the low pressure needle 25 and the high pressure needle 26. In at least some embodiments, multiple microcontrollers are used wherein, for example, each gauge and stepper motor are connected to a respective microcontroller. The microcontroller 50 functions to calibrate the two gauges on startup or otherwise when reset. The microcontroller 50 also relays information to the stepper motors 41, 42 to actuate the needles 25, 26 to visually confirm calibration of the needles. In the illustrated embodiment, the microcontroller 50 calibrates the needles upon startup of the device and sends information to the stepper motors to actuate the needles to visually confirm to a user that the device has been calibrated. The microcontroller 50 is electrically connected to a plurality of pressure transducers (not shown) that are locatable in, or located in, respective fluid streams of the HVAC system. For example, a first pressure transducer is mounted or received in the low pressure fluid stream, a second pressure transducer is mounted received in the high pressure fluid stream, and a third pressure transducer is mounted or received within the vacuum side of the system. Typical pressure transducers include a strain gauge that deflects a ceramic or like disc to, in turn, generate a corresponding electrical signal (voltage or current) indicative of the respective fluid pressure. The electrical signals are transmitted to the microcontroller 50 which, in turn, controls the stepper motors to move the respective gauge needles to positions indicating the respective measured pressures.

In the illustrated embodiment, an optional display 60, such as a LCD screen, is disposed between the two gauges 21, 22. The display 60 displays various information such as the type of refrigerant used, and the pressure and/or temperature, such as super heated and sub-cooling refrigerant temperatures. The display 60 may further display an error or alert message informing the technician that a calibration was unsuccessful. In the illustrated embodiment, the display 60 further includes a vacuum gauge for indicating the vacuum pressure of the HVAC system. The vacuum gauge also may be referred to as a "micron gauge" where it displays the vacuum pressure in microns. The device includes a pressure transducer as described above (not shown) for transmitting signals to the microcontroller 50 indicative of the vacuum pressure and the microcontroller, in turn, controls the display 60 to display such signals when the vacuum gauge readout on the display is selected. Below the LCD screen 60, a variety of buttons, knobs or switches 65 may be disposed, which aid the user in selecting the proper mode or refrigerant. The buttons 65 may further toggle a switch between units such as temperature from degrees Fahrenheit to degrees Celsius, or units of pressure such as psi or bar. In at least some embodiments, at least one of the buttons 65 initiates a calibration or resets the device so that it is calibrated.

The gauges 21, 22 are digital gauges of a type known to those of ordinary skill in the pertinent art that automatically calibrate themselves at startup. In accordance with the present invention, the gauges 21, 22 visually confirm to a user that they have been calibrated at startup by performing several sweeps of the needles 25, 26 as hereinafter described. As shown in FIG. 2A, upon startup, the low pressure needle 25 and the high pressure needle 26 perform a backward sweep, moving counterclockwise around the faces or dials of their respective gauges 21, 22 for at least a portion of a revolution. FIG. 2A shows the low pressure needle 25 and the high pressure needle 26 disposed at a position counterclockwise of the zero position, but before the maximum of each of the two gauges 21, 22 (which is achieved by moving the needles in the opposite or clockwise direction, as described below). After completion of the backward sweep, the gauges then perform the second step of visually confirming calibration.

As shown in FIG. 2B, the second step of visually confirming calibration is a forward sweep of the needles 25, 26. In the illustrated embodiment, the low pressure needle 25 and the high pressure needle 26 rotate clockwise from the zero psi position to the maximum position on each of the respective gauges. As shown in FIG. 2B, the maximum position of the low pressure gauge is 500 psi and the maximum position of the high pressure gauge is 800 psi. However, as may be recognized by those of ordinary skill in the pertinent art based on the teachings herein, the particular maximum pressures are only exemplary and may be changed as desired or otherwise required. Thus, the low pressure needle 25 moves to the maximum forward sweep position 27 (e.g., 500 psi) and the high pressure needle 26 moves to the maximum forward sweep position 28 (e.g., 800 psi). It will be understood that the needles 25, 26 need not complete a sweep to the maximum forward sweep positions 27, 28. In at least some embodiments, the needles 25, 26 complete a sweep of a portion of the maximum position (e.g., about ¾, ⅔, or ½ of the maximum position) or a portion of a full rotation around the entire dial of each gauge 21, 22.

As shown in FIG. 2C, after moving to the maximum forward positions 27, 28, the third step of the process of visually confirming calibration includes zeroing the low pressure needle 25 and the high pressure needle 26. In the zeroing step, and as indicated by the broken lines in FIG. 2C, the low pressure needle 25 rotates counterclockwise from the maximum forward sweep position 27 to the zero position. The high pressure needle 26 likewise rotates counterclockwise from the maximum forward sweep position 28 to the zero position.

As may be recognized by those of ordinary skill in the pertinent art based on the teachings herein, numerous changes and modifications can be made to the above-described and other embodiments of the present invention without departing from the scope of the invention as defined in the appended claims. Many of the features of the steps described above are only exemplary, and may be changed as desired, or otherwise as required to meet the requirements of a particular application. For example, the forward and backward sweeps may be interchanged or performed in any order. In at least some other embodiments, a plurality of forward sweeps or a plurality of backward sweeps may be performed during calibration or visual confirmation thereof. In at least some other embodiments, the calibration or visual confirmation thereof are performed by the respective gauges sequentially, rather than substantially simultaneously or in synchronization with each other as described above. For example, the low pressure gauge 21 may be first calibrated and visually confirmed, followed by calibration and visual confirmation thereof by the high pressure gauge 22, or vice versa. Accordingly, this detailed description of the currently preferred embodiments is to be taken in an illustrative, as opposed to a limiting sense.

What is claimed is:

1. A device comprising:
a first gauge including a first needle mounted thereon and connectable in communication with a HVAC system, the first needle visually displaying a first pressure reading of the HVAC system;
a first motor drivingly coupled to the first needle for moving the first needle; and
at least one microcontroller electrically coupled to the first motor and configured to move the first needle from a first position to at least one second position at least one of (i) during calibration, and (ii) following calibration, of the first gauge where at least one of the first position and the second position of the first needle are not indicative of pressure in the HVAC system, and to move the first needle to a zero position.

2. A device as defined in claim 1, wherein the microcontroller is configured to automatically calibrate the first gauge.

3. A device as defined in claim 2, wherein the microcontroller automatically calibrates the first gauge during at least one of (i) at startup, and (ii) when the first gauge is powered on.

4. A device as defined in claim 1, wherein the at least one second position includes at least one of the following: (i) a backward swept position, (ii) a forward swept position, and (iii) the zeroed position.

5. A device as defined in claim 4, wherein the at least one second position includes the backward swept position, the forward swept position, and the zeroed position, and the microcontroller is configured to control the first motor to move the first needle to the backward swept position, the forward swept position, and the zeroed position in the order indicated.

6. A device as defined in claim 4, wherein the backward swept position is between the zero position and the maximum pressure position, and the forward swept position is the maximum pressure position.

7. A device as defined in claim 1, further comprising:
a second gauge including a second needle mounted thereon and connectable in communication with the HVAC system, the second needle visually displaying a second pressure reading of the HVAC system; and
a second motor drivingly coupled to the second needle for moving the second needle;
wherein the microcontroller is electrically coupled to the second motor and configured to move the second needle from a first position to at least one second position at least one of (i) during calibration, and (ii) following calibration, of the second gauge where at least one of the first position and the second position of the first needle are not indicative of pressure in the HVAC system, and to move the first needle to a zero position.

8. A device as defined in claim 7, comprising a HVAC manifold including the first and second gauges mounted thereon and connectable to the HVAC system.

9. A device as defined in claim 8, wherein the first gauge is a low pressure gauge and the second gauge is a high pressure gauge.

10. A device as defined in claim 8, wherein the first and second motors are stepper motors.

11. A device as defined in claim 8, wherein the at least one microcontroller is configured to move the first and second needles, via the first and second motors, by performing a counterclockwise sweep to an approximately minimum position, a clockwise sweep to an approximately maximum position, and then a counterclockwise sweep to an approximately zero position.

12. A device as defined in claim 8, wherein the first and second needles are at least one of (1) moved sequentially relative to each other, or (ii) move substantially in synchronization with each other.

13. A device as defined in claim 1, further comprising an actuator for resetting the device and initiating calibration.

14. A device comprising:
first means comprising a first needle connectable in communication with a HVAC system, the first needle visually displaying a first pressure reading of the HVAC system;
second means drivingly coupled to the first needle for moving the first needle to positions corresponding to respective first pressure readings of the HVAC system; and
third means electrically coupled to the second means for moving the first needle from a first position to at least one second position at least one of (i) during calibration, and (ii) following calibration, of the first means where at least one of the first position and the second position of the first needle are not indicative of pressure in the HVAC system, and to move the first means to a zero position.

15. A device as defined in claim 14, wherein the second means is a first stepper motor, and the third means is at least one microcontroller.

16. A device as defined in claim 14, further comprising:
fourth means comprising a second needle connectable in communication with the HVAC system, the second needle visually displaying a second pressure reading of the HVAC system; and
fifth means drivingly coupled to the second needle for moving the second needle to positions corresponding to respective second pressure readings of the HVAC system;
wherein the third means is electrically coupled to the fifth means for moving the second needle from a first position to at least one second position at least one of (i) during calibration, and (ii) following calibration, of the fourth means where at least one of the first position and the second position are not indicative in pressure in the HVAC system and to move the fourth means to a zero position.

17. A device as defined in claim 16, wherein the fifth means is a second stepper motor, and the third means is at least one microcontroller.

18. A method comprising the following steps:
connecting a device comprising:
a first gauge including a first needle mounted thereon and connectable in communication with a HVAC system, the first needle visually displaying a first pressure reading of the HVAC system;
a first motor drivingly coupled to the first needle for moving the first needle; and
at least one microcontroller electrically coupled to the first motor and configured to move the first needle from a first position to at least one second position at least one of (i) during calibration, and (ii) following calibration, of the first gauge where at least one of the first position and the second position of the first needle are not indicative of pressure in the HVAC system, and to move the first needle to a zero position;
calibrating the first gauge; and
during and/or following calibration of the first gauge, visually confirming calibration by moving the first needle of the first gauge from the first position to the at least one second position.

19. A method as defined in claim 18, wherein the at least one second position includes at least one of the following: (i) a backward swept position, (ii) a forward swept position, and (iii) a zeroed position.

20. A method as defined in claim 19, wherein the at least one second position includes all three positions performed in the order indicated.

21. A method as defined in claim 18, further comprising the following steps:
connecting a second gauge including a second needle mounted thereon to the HVAC system;
calibrating the second gauge; and
during and/or following calibration of the second gauge, visually confirming calibration by moving a second needle of the second gauge from a first position to at least one second position.

22. A method as defined in claim 21, wherein the visually confirming calibration steps are performed on the first and second gauges either (i) at substantially the same time, or (ii) on the second gauge following the first gauge, or vice versa.

* * * * *